(12) United States Patent
Akiyama et al.

(10) Patent No.: US 9,914,590 B2
(45) Date of Patent: Mar. 13, 2018

(54) WORKPIECE CONVEYANCE METHOD AND WORKPIECE CONVEYANCE DEVICE

(71) Applicant: Nippon Electric Glass Co., Ltd., Shiga (JP)

(72) Inventors: Shuji Akiyama, Shiga (JP); Kaoru Mitsugi, Shiga (JP); Koji Nishijima, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 15/126,128

(22) PCT Filed: Mar. 18, 2015

(86) PCT No.: PCT/JP2015/058129
§ 371 (c)(1),
(2) Date: Sep. 14, 2016

(87) PCT Pub. No.: WO2015/141748
PCT Pub. Date: Sep. 24, 2015

(65) Prior Publication Data
US 2017/0073164 A1 Mar. 16, 2017

(30) Foreign Application Priority Data
Mar. 20, 2014 (JP) ................. 2014-058008

(51) Int. Cl.
| | |
|---|---|
| *B65G 49/06* | (2006.01) |
| *B65G 13/06* | (2006.01) |
| *B65G 13/071* | (2006.01) |
| *B65H 20/02* | (2006.01) |
| *F16C 13/00* | (2006.01) |
| *B65G 39/02* | (2006.01) |
| *B65H 23/04* | (2006.01) |

(52) U.S. Cl.
CPC ........... *B65G 13/06* (2013.01); *B65G 13/071* (2013.01); *B65G 39/02* (2013.01); *B65G 49/06* (2013.01);
(Continued)

(58) Field of Classification Search
CPC ..... B65H 2406/40; B65G 49/06; B65G 13/06
See application file for complete search history.

(56) References Cited

U.S. PATENT DOCUMENTS

| | | | |
|---|---|---|---|
| 4,029,929 A * | 6/1977 | Rietveld | B23H 7/06 219/69.12 |
| 8,806,894 B2 * | 8/2014 | Tomamoto | B32B 17/064 428/426 |

(Continued)

FOREIGN PATENT DOCUMENTS

| | | |
|---|---|---|
| CN | 102089223 | 6/2011 |
| JP | 60-161826 | 8/1985 |

(Continued)

OTHER PUBLICATIONS

Chinese Office Action with Search Report dated May 16, 2017 in counterpart Chinese Patent Applcation 201580014860.3 with partial English translation.

(Continued)

*Primary Examiner* — Thomas Randazzo
(74) *Attorney, Agent, or Firm* — Wenderoth, Lind & Ponack, L.L.P.

(57) ABSTRACT

Provided is a workpiece conveyance method for conveying a workpiece (1) in a predetermined direction by applying a conveying force (F) to the workpiece (1) while supporting the workpiece (1) through use of free rollers (11), and the workpiece conveyance method includes: applying flows of a fluid to the free rollers (11) to apply a rotation auxiliary force (f) to the free rollers (11) in a rotation direction of the free rollers (11) during conveyance of the workpiece (1).

8 Claims, 5 Drawing Sheets

(52) U.S. Cl.
CPC ........... *B65H 20/02* (2013.01); *B65H 23/048* (2013.01); *F16C 13/00* (2013.01); *B65H 2220/02* (2013.01); *B65H 2406/122* (2013.01); *B65H 2406/40* (2013.01); *B65H 2513/10* (2013.01); *B65H 2515/31* (2013.01); *B65H 2801/61* (2013.01)

(56) References Cited

U.S. PATENT DOCUMENTS

| | | | |
|---|---|---|---|
| 9,676,579 B2* | 6/2017 | Mori | B65H 23/195 |
| 2011/0177325 A1* | 7/2011 | Tomamoto | B65H 18/28 |
| | | | 428/332 |
| 2013/0129987 A1* | 5/2013 | Mitsugi | C03B 35/163 |
| | | | 428/189 |

FOREIGN PATENT DOCUMENTS

| | | | | |
|---|---|---|---|---|
| JP | 2-265852 | | 10/1990 | |
| JP | 02265852 A | * | 10/1990 | ........... B65H 23/192 |
| JP | 02265852 A | * | 10/1990 | ........... B65H 23/192 |
| JP | 7-76411 | | 3/1995 | |
| JP | 2010-132531 | | 6/2010 | |

OTHER PUBLICATIONS

International Search Report dated Jun. 23, 2015 in International (PCT) Application No. PCT/JP2015/058129.

\* cited by examiner

FIG. 11 ical Field

The present invention relates to a workpiece conveyance method and a workpiece conveyance apparatus.

BACKGROUND ART

As is well known, as image display devices of recent years, flat panel displays are mainstream (hereinafter, simply referred to as "FPDs") as typified by liquid crystal displays (LCDs), plasma displays (PDPs), field emission displays (FEDs), organic light-emitting diode (OLED) displays, and other displays. Lightening of those FPDs has been promoted. Accordingly, there is also an increasing demand for thinning glass substrates to be used in the FPDs.

Further, in recent years, glass formed to be as thin as a film have been developed, and hence there is employed a system of continuously rolling up a manufactured long glass film around a roll core to form a roll for storage.

On such a roll body of the glass film, processes such as film formation, cutting, washing, and drying may be performed using the so-called "roll-to-roll" system. Those processes are performed while the glass film in a form of a sheet drawn out of the glass roll, which is formed by rolling up the glass film, is supported and conveyed by rollers (for example, refer to Patent Literature 1).

CITATION LIST

Patent Literature 1: JP 2010-132531 A

SUMMARY OF INVENTION

Technical Problem

A plurality of the rollers of this type are arranged along a conveying direction. Further, when the long glass film is continuously conveyed as described above, it is desired that all the plurality of rollers be driven to rotate at the same speed. However, in order to drive the rollers to rotate, driving sources such as motors and the rollers need to be mechanically connected to each other through intermediation of power transmission elements such as gears and belts. Thus, in an attempt to drive all the rollers to rotate, influence of dust emission cannot be disregarded. Therefore, as measures to rotate as many rollers as possible (desirably, all the rollers) in synchronization with each other while suppressing the influence of the dust emission as much as possible, it is conceivable, for example, to allow most or all of the plurality of rollers to have an idly rotatable configuration (to be so-called "free rollers"), and apply a driving force such as a roll-up force to the glass film from elements other than the free rollers, to thereby cause the rollers held in abutment against the glass film to be rotated by a conveying force applied to the glass film.

However, even when the rollers are allowed to be idly rotatable (that is, the rollers are free rollers), actually, variation in magnitude of rotational resistance among the free rollers may occur due to circumstances such as variation in rotational resistance between the rollers and parts configured to rotatably support the rollers. Thus, when the glass film is conveyed with the conveyance apparatus having the above-mentioned configuration, a rotational speed of free rollers having relatively high rotational resistance may become less than that of other free rollers (having relatively low rotational resistance), or the free rollers may not be smoothly rotated, and hence slippage may occur between the free rollers and the glass film. As a result, the glass film may be damaged depending on a degree of the slippage.

The above-mentioned problems may occur not only in the case of the glass film but also in the case of conveying plate glass pieces. The above-mentioned problems may generally occur in the cases of workpieces which are made of materials other than glass, formed into a film or a sheet, and conveyed.

In view of the above-mentioned circumstances, a technical object to be achieved by the present invention is to allow all conveying free rollers to be rotated in synchronization with workpieces to a maximum extent, to thereby allow the workpieces to be conveyed without flawing their surfaces to be supported.

Solution to Problem

The above-mentioned object is achieved by a workpiece conveyance method according to an embodiment of the present invention. That is, the workpiece conveyance method is a method for conveying a workpiece in a predetermined direction by applying a conveying force to the workpiece while supporting the workpiece through use of free rollers, the conveyance method comprising: applying flows of a fluid to the free rollers to apply a rotation auxiliary force to the rollers in a rotation direction of the free rollers during conveyance of the workpiece.

As described above, according to the embodiment of the present invention, the flows of the fluid are applied to the free rollers to apply the rotation auxiliary force to the free rollers in the rotation direction during the conveyance of the workpiece. Thus, rotational resistance of the free rollers having received the rotation auxiliary force may be improved (alleviated). In this way, variation in rotational resistance among the free rollers can be reduced to a maximum extent. Thus, when the free rollers are rotated while supporting the workpiece, all the free rollers can be rotated in synchronization with each other to a maximum extent. Therefore, occurrence of slippage between the free rollers having relatively high rotational resistance and the workpiece can be suppressed, thereby enabling conveyance of the workpiece while preventing damage to the workpiece as much as possible.

Further, in the workpiece conveyance method according to the embodiment of the present invention, the flows of the fluid may be applied to the free rollers to apply the rotation auxiliary force to the free rollers when the free rollers are being rotated while supporting the workpiece having received the conveying force. Alternatively, the flows of the fluid may be applied to the free rollers to apply the rotation auxiliary force to the free rollers immediately before the free rollers start to be rotated while supporting the workpiece having received the conveying force.

As described above, the present invention works effectively when the free rollers are rotated while supporting the workpiece having received the conveying force. However, when there can be observed significant differences in resistance at the start of the rotation, the flows of the fluid may be applied to the free rollers immediately before the free rollers start to be rotated while supporting the workpiece to apply the rotation auxiliary force to the free rollers. In this way, the free roller can smoothly start to be rotated while supporting the workpiece, and hence occurrence of slippage at the start of the rotation can be effectively prevented as much as possible.

Further, the workpiece conveyance method according to the embodiment of the present invention may further comprise adjusting volumes of the flows of the fluid such that the rotation auxiliary force is relatively large immediately before the free rollers start to be rotated while supporting the workpiece having received the conveying force, and that the rotation auxiliary force is relatively small after the free rollers start to be rotated while supporting the workpiece having received the conveying force.

In a comparison between a rotational resistance of the free rollers during the rotation while supporting the workpiece and a rotational resistance of the free rollers immediately before the start of the rotation, it can be generally assumed that the rotational force is larger immediately before the start of the rotation because a force (moment) equal to or larger than a moment of inertia is needed. Meanwhile, when an unnecessarily large force (rotation auxiliary force) is applied to the free rollers, the free rollers are rotated at a speed higher than that of the workpiece. As a result, undesired idling of the free rollers may be caused, and hence the application of the unnecessarily large force is not preferred. Thus, as described above, the volumes of the flows to be applied to the free rollers (specifically, flow rate, fluid pressure, and flow speed) are adjusted such that the rotation auxiliary force is relatively large immediately before the start of the rotation, and that the rotation auxiliary force is relatively small after the start of the rotation. With this, the flows of the fluid at volumes appropriate to respective timings can be applied to the free rollers. Thus, at any timing, the workpiece and the free rollers are effectively synchronized with each other.

Further, in the workpiece conveyance method according to the embodiment of the present invention, the fluid may comprise air to be impinged on the free rollers to apply the rotation auxiliary force to the free rollers.

Employing the air as the fluid to be applied to the free rollers eliminates a risk in that the fluid adheres to the free rollers or the workpiece. Thus, the present invention can be applied to steps of any type. Further, when the air is employed among gases, existing air-introducing equipment installed in factories can be utilized as it is. In this way, the air is preferred as compared to other gases in view of both installation cost and running cost. In addition, the air is preferred as compared to liquids in view of no need to collect.

Further, in the workpiece conveyance method according to the embodiment of the present invention, the workpiece may comprise a glass film to be supported and conveyed by the free rollers. Further, in this case, in the workpiece conveyance method according to the embodiment of the present invention, when predetermined processes of a Roll To Roll system are performed on the glass film, a part of the glass film drawn out of a glass roll, which is formed by rolling up the glass film, may be supported by the free rollers.

As described above, the conveyance method according to the embodiment of the present invention has been devised in the aim of allowing all the free rollers to be rotated in synchronization with each other, and hence works particularly effectively in a case where a conveyed subject is the glass film supported by the plurality of free rollers. Further, when the predetermined processes of the Roll To Roll system are performed on the glass film, a roll-up force of a glass roll on a downstream side is applied as the conveying force of the workpiece. Thus, the conveying force varies depending on a roll-up amount (roll diameter), and the variation in rotational resistance among the free rollers may be reflected conspicuously by the rotation in synchronization with the workpiece. As a result, behavior of the workpiece during the conveyance may be unstabilized. However, when the present invention is applied, such problems are solved, and the stable synchronous rotation can be performed. Further, in this case, under a state in which both sides of the glass film in a longitudinal direction are respectively rolled up into rolls, an operation of rolling up the glass film into a glass roll on one side may give a conveying force to the glass film drawn out of a glass roll on the other side.

Further, in the workpiece conveyance method according to the embodiment of the present invention, the free rollers may each comprise: a free roller body to be held in abutment against the workpiece; and receiving portions formed so as to be rotatable integrally with the free roller body and configured to receive the flows of the fluid.

The flows of the fluid generated by a conveying force applying unit may be applied to outer peripheral surfaces of the free rollers. However, the outer peripheral surfaces function as abutment surfaces with respect to the workpiece, and hence there is a problem in that regions capable of receiving the flows of the fluid are restricted. Therefore, as described above, the free rollers each comprise the free roller body to be held in abutment against the workpiece, and the receiving portions formed so as to be rotatable integrally with the free roller body and configured to receive the flows of the fluid. With this, the flows of the fluid may be applied to regions other than the free roller body to be held in abutment against the workpiece, for example, applied to vicinities of end portions of each of the free rollers. In this way, a structure of a conveyance apparatus can be prevented from being complicated or enlarged, and can be simplified and downsized.

Further, in a workpiece conveyance apparatus according to an embodiment of the present invention, when the free rollers each comprise the free roller body and the receiving portions, the receiving portions may each comprise: a receiving portion base axially adjacent to the free roller body; and projection portions protruded radially outward from an outer peripheral surface of the receiving portion base. Alternatively, in the workpiece conveyance apparatus according to an embodiment of the present invention, the receiving portions may each comprise: a receiving portion base axially adjacent to the free roller body; and recess portions retreated radially inward from an outer peripheral surface of the receiving portion base.

With the above-mentioned configurations, in comparison with the case where the flows of the fluid are applied to the cylindrical outer peripheral surfaces, the flows of the fluid can be more effectively received. When the receiving portions each comprise the receiving portion base and the projection portions protruded radially outward from the outer peripheral surface of the receiving portion base, the flows of the fluid can be received by the projection portions, thereby being capable of receiving the flows of the fluid on a radially outer side. Thus, the rotation auxiliary force (rotational moment) to be applied to the free rollers can be increased as much as possible. Alternatively, when the receiving portions each comprise the receiving portion base and the recess portions retreated radially inward from the outer peripheral surface of the receiving portion base, the flows of the fluid are received by the recess portions, thereby being more likely to fully receive the flows of the fluid. With this, the flows of the fluid can be effectively converted to the rotation auxiliary force and applied to the free rollers.

Further, the above-mentioned object is achieved also by the workpiece conveyance apparatus according to another embodiment of the present invention. That is, the workpiece conveyance apparatus comprises: a conveying force applying unit configured to apply a conveying force to a workpiece; free rollers configured to support the workpiece having received the conveying force; and an auxiliary force applying unit configured to apply flows of a fluid to the free rollers to apply a rotation auxiliary force to the free rollers in a rotation direction of the free rollers during conveyance of the workpiece, wherein the free rollers each comprise: a free roller body to be held in abutment against the workpiece; and receiving portions formed so as to be rotatable integrally with the free roller body and configured to receive the flows of the fluid.

According to the conveyance apparatus, as in the above-mentioned workpiece conveyance method according to the one embodiment of the present invention, the flows of the fluid are applied by the auxiliary force applying unit to the receiving portions of the free rollers. With this, the rotation auxiliary force can be applied to the free rollers in the rotation direction during the conveyance of the workpiece. As a result, the rotational resistance of the free rollers having received the rotation auxiliary force is improved (alleviated). In this way, the variation in rotational resistance among the free rollers can be reduced to a maximum extent. Thus, all the free rollers can be rotated in synchronization with each other to a maximum extent at the time of being rotated while supporting the workpiece. Therefore, occurrence of slippage between the free rollers, which have relatively high rotational resistance, and the workpiece can be suppressed. With this, the workpiece can be conveyed while damage to the workpiece is prevented as much as possible.

Advantageous Effects of Invention

As described above, according to the embodiment of the present invention, all conveying free rollers may be allowed to be rotated in synchronization with workpieces to a maximum extent, and hence the workpieces can be conveyed without flawing their surfaces to be supported.

DESCRIPTION OF EMBODIMENTS

Now, a workpiece conveyance method and a workpiece conveyance apparatus according to a first embodiment of the present invention are described with reference to FIG. 1 to FIG. 6. This embodiment is described by way of an example of a case where a glass film, which is a belt-like plate glass, is an object to be conveyed (workpiece), and predetermined processes of a Roll To Roll system are performed on this glass film.

Figure 1:
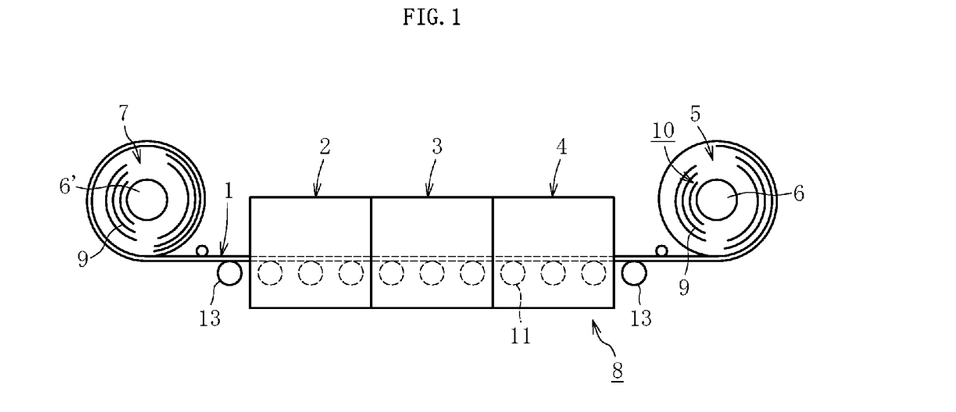
FIG. 1 is a view for illustrating an overview of a workpiece conveyance method and a workpiece conveyance apparatus according to a first embodiment of the present invention.

FIG. 1 is a view for schematically illustrating a processing flow for a glass film 1 according to the present invention. As illustrated in FIG. 1, this processing flow includes a washing step 2, a drying step 3, and an antistatic 4 performed successively to the glass film 1 using the Roll To Roll system. Those steps are performed while the glass film 1, which is rolled up at both longitudinal ends, is conveyed in a predetermined direction. Specifically, a roll core 6 of a glass roll 5 on one side (downstream side) is driven to rotate such that an operation of rolling up the glass film 1 into the glass roll 5 on the one side is performed. With this, the glass film 1 rolled up into a glass roll 7 on the other side (upstream side) is drawn out. While the glass film 1 thus drawn out is conveyed in a predetermined direction by a conveyance apparatus 8, the washing step 2, the drying step 3, and the destaticizing step 4 are sequentially performed.

The glass film 1 may be a glass formed into a belt shape by publicly known methods such as an overflow downdraw method, and a thickness of the glass film 1 may be adjusted, for example, to 300 µm or less, more preferably to 200 µm or less, and yet more preferably to 100 µm or less. Further, on the glass film 1, a resin sheet 9 called "leader", which is rich in toughness, is coupled to one longitudinal end (or both longitudinal ends) of one or a plurality of belt-like plate glasses, and an end portion of the resin sheet 9 is coupled to the roll core 6. With this, the glass film 1 can be rolled up together with the resin sheet 9. FIG. 1 is an illustration of a state in which the glass film 1 and the resin sheets 9 coupled to both ends of the glass film 1 are rolled up together into the glass rolls 5 and 7. As a matter of course, a mode of rolling up the glass film 1 alone into the glass rolls 5 and 7 can also be employed.

Figure 2:
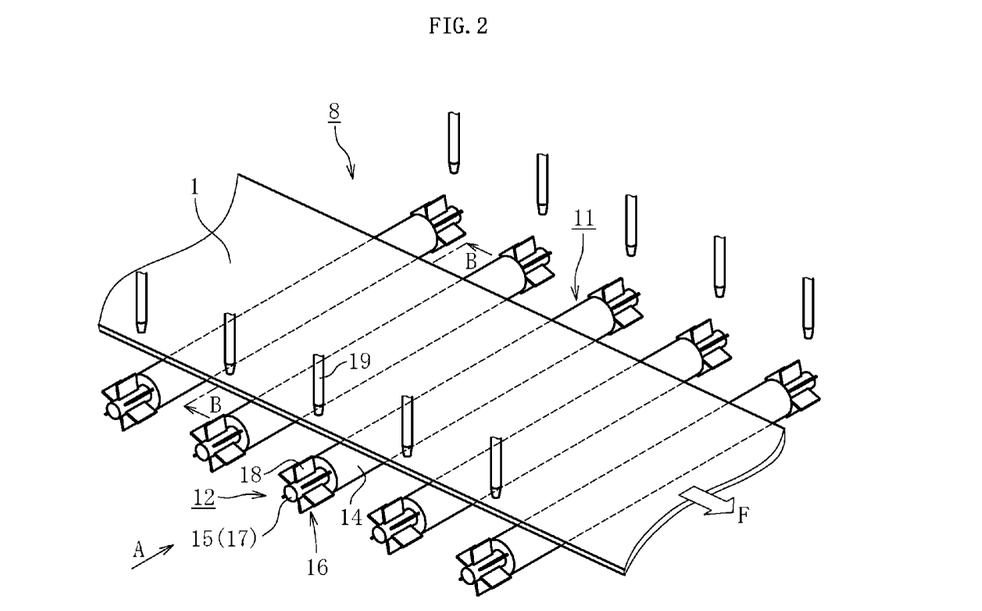
FIG. 2 is a perspective view for illustrating a main part of FIG. 1.

Next, the conveyance apparatus 8 for the glass film 1 is described. As illustrated in FIG. 1 and FIG. 2, this conveyance apparatus 8 comprises a conveying force applying unit 10 configured to apply a conveying force F to the glass film 1, free rollers 11 configured to support the glass film 1 having received the conveying force F, and an auxiliary force applying unit 12 configured to apply fluid flows, to thereby apply a rotation auxiliary force f to the free rollers 11 in the rotation direction of the free rollers 11 during conveyance of the glass film 1 (refer to FIG. 3 described later). In this embodiment, the conveying force applying unit 10 comprises the above-mentioned roll core 6 on the one side (downstream side), and a driving source (not shown) configured to drive the roll core 6 to rotate. Further, most of rollers for supporting the glass film 1 that is continuous from the glass roll 5 on the one side to the glass roll 7 on the another side are the free rollers 11, and only rollers arranged at both the longitudinal ends are driving rollers 13. As a matter of course, as long as there is no particular problem in a procedure of the conveyance, all the rollers may be the free rollers 11.

Figure 4:
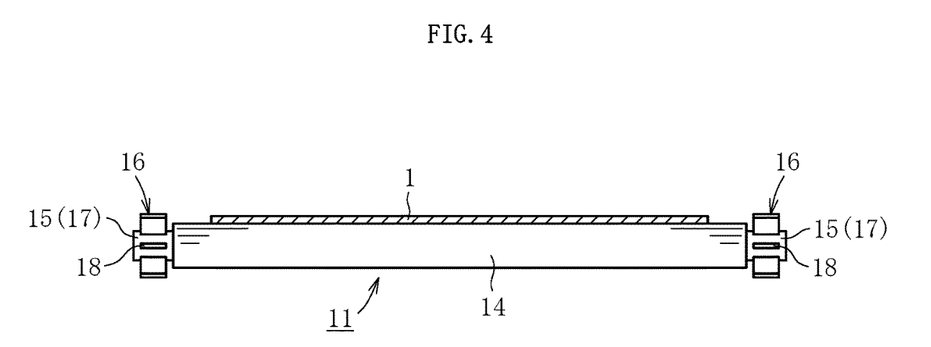
FIG. 4 is a sectional view for illustrating the conveyance apparatus illustrated in FIG. 2, which is taken along the line B-B of FIG. 2.

The free rollers 11 each integrally comprise a free roller body 14 to be held in abutment against the glass film 1 as a workpiece, and a spindle 15 having the free roller body 14 on its outer periphery. As illustrated in FIG. 4, the free roller body 14 has a longitudinal dimension larger than a widthwise dimension (dimension in a direction which is in flush with and orthogonal to a longitudinal direction) of the glass film 1. With this, an entire widthwise region of the glass film 1 can be supported by an outer peripheral surface of the free roller body 14. The spindle 15 is protruded from both longitudinal ends of the free roller body 14. Protruded parts of the spindle 15 are supported in a freely rotatable manner by frames (not shown). With this, the spindle 15 and the free roller body 14 can be rotated integrally with each other.

Figure 3:
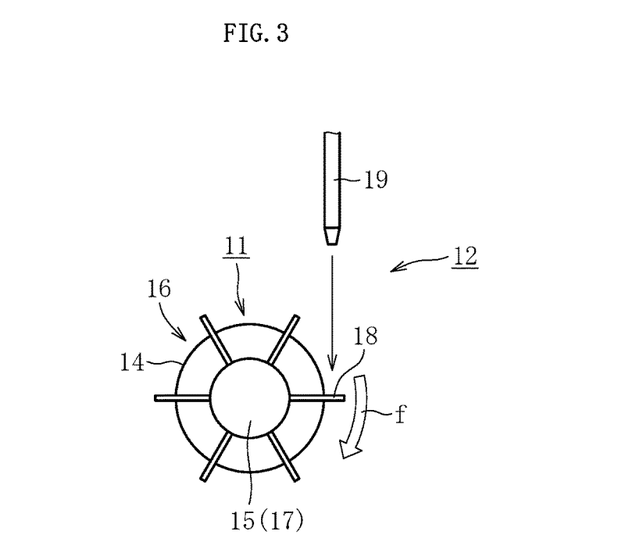
FIG. 3 is a view (main-part enlarged view) for illustrating the conveyance apparatus illustrated in FIG. 2, which is viewed from a direction of the arrow A of FIG. 2 (enlarged view of a main part).

Further, the free rollers 11 each comprise receiving portions 16 configured to receive the flows of fluid generated by the auxiliary force applying unit 12. In this embodiment, those receiving portions 16 each comprise a receiving portion base 17 axially adjacent to the free roller body 14, and projection portions 18 protruded radially outward from an outer peripheral surface of the receiving portion base 17. In the illustrated example, parts of the spindle 15, which are protruded from the free roller body 14 toward both the longitudinal end sides, each serve as the receiving portion base 17. Further, as illustrated in FIG. 3, the projection portions 18 are each formed into a blade shape, and arranged at a plurality of positions (six in the illustrated example) radially and equiangularly on the outer peripheral surface of the receiving portion base 17.

The auxiliary force applying unit 12 of this embodiment comprises a plurality of nozzles 19 configured to eject air as a fluid, and a control unit (not shown) capable of controlling the ejection of the air from the plurality of nozzles 19. For example, as illustrated in FIG. 2, the nozzles 19 are arranged so as to correspond to the receiving portions 16. An ejecting direction is set such that the air ejected from the nozzles 19 is impinged on the projection portions 18 of the corresponding receiving portions 16. In the illustrated example, the nozzles 19 are arranged above the corresponding receiving portions 16, and an ejecting direction of the air is adjusted to a vertically downward direction. Further, orientations and positions of the nozzles 19 are set such that the projection portions 18 having received flows (jets) of the air from the nozzles 19 are rotated in the same direction as the direction of rotation of the free rollers 11 during the conveyance of the glass film 1.

Further, the control unit (not shown) is capable of collectively controlling ejection amounts of the air from the nozzles 19 (for example, ejection flow rate). For example, the control unit is capable of controlling the ejection amounts of the air can be controlled such that, immediately before the free rollers 11 start to be rotated while supporting the glass film 1 having received the conveying force F, the rotation auxiliary force f (FIG. 3) to be applied to the free rollers 11 is relatively large. Further, the control unit is capable of controlling the ejection amounts of the air in two stages such that, after the free rollers 11 start to be rotated while supporting the glass film 1 having received the conveying force F, the rotation auxiliary force f to be applied to the free rollers 11 is relatively small. The rotation auxiliary force f herein refers exclusively to a force of supporting the rotation of the free rollers 11 along with the conveyance of the glass film 1. Thus, it does not matter whether or not the free rollers 11 are rotated when the flows (jets) of the air are applied under a state in which the glass film 1 is not supported. It is important to adjust the ejection amount of the air to an extent that variation in rotational resistance among the free rollers 11 can be alleviated or offset. As a matter of course, excessively large force f may induce unnecessary idling of the free rollers 11. Thus, it is preferred that the ejection amount of the air be adjusted to an extent that such disadvantage may not be caused.

Now, an example of the conveyance method for the glass film 1 with use of the conveyance apparatus 8 having the above-mentioned configuration is described. In this embodiment, a case is described in which one end portion of each of the resin sheets 9 serving as the leaders is coupled to each of both ends of the glass film 1 through intermediation of a coupling member 20 (refer to FIG. 5 and FIG. 6), and the other end portion of each of the coupled two resin sheets 9 is coupled respectively to the roll core 6 of the glass roll 5 on the one side, and to a roll core 6' of the glass roll 7 on the another side, to thereby perform a series of processes of the Roll To Roll system (washing step 2, drying step 3, and antistatic step 4).

Figure 5:
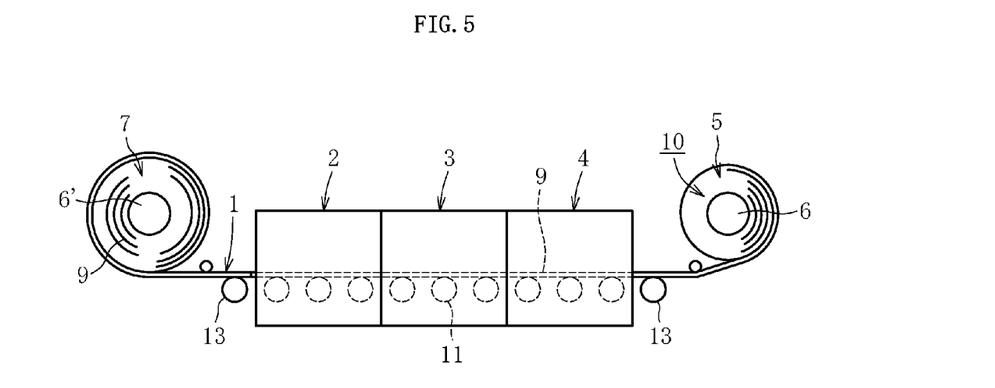
FIG. 5 is a view for illustrating a workpiece conveyance method according to the first embodiment of the present invention, and illustrating a state immediately before free rollers start to be rotated while supporting a workpiece.
Figure 6:
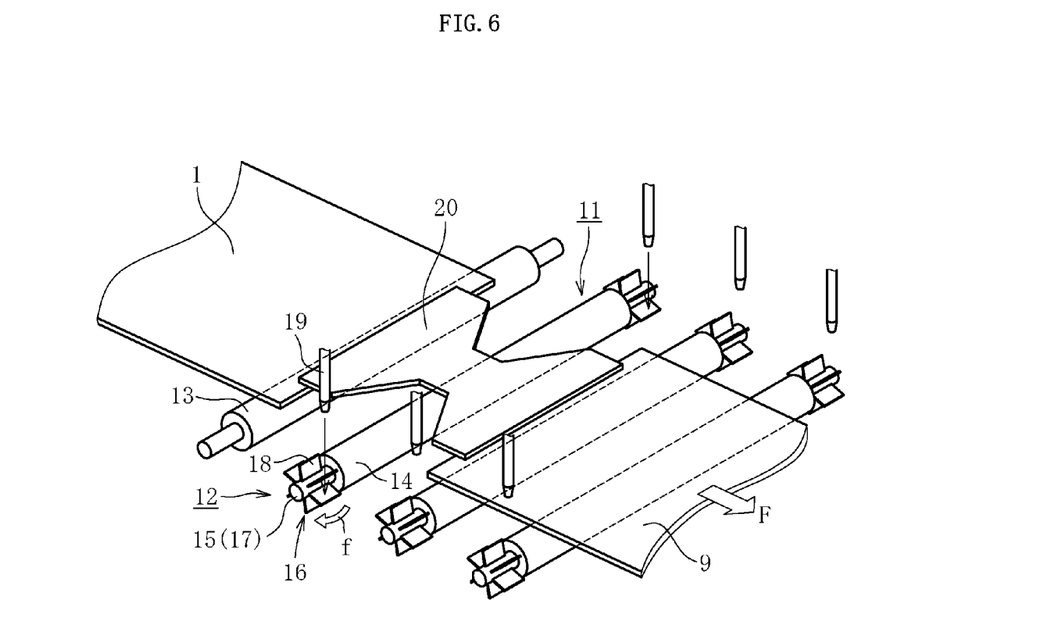
FIG. 6 is a perspective view for illustrating a main part of FIG. 5.

First, as illustrated in FIG. 5, the resin sheet 9 on a leading end side is drawn out of the upstream glass roll 7 comprising the roll core 6' having the glass film 1 and the resin sheet 9 rolled up therearound. Only this resin sheet 9 is rolled up around the downstream roll core 6. The downstream roll core 6 is driven to rotate such that the glass film 1 is drawn out of the glass roll 7 formed around the upstream roll core 6'. With this, conveyance of the glass film 1 is started. Then, as illustrated in FIG. 6, immediately before a forward end portion of the glass film 1 having drawn out of the glass roll 7 (having received the conveying force F) is brought into abutment against the free rollers 11 located on the most upstream side (in FIG. 5, leftmost one of the free rollers 11), the air is ejected from corresponding one of the nozzles 19 to the projection portions 18 of the receiving portion 16 of the free roller 11. With this, the jet of the air is impinged on the projection portions 18. In this way, the rotation auxiliary force f can be applied to the free roller 11 rotated integrally with the receiving portion 16 in a rotation direction during the conveyance of the glass film 1.

Then, when the glass film 1 reaches (abuts against) a top of the free roller 11 having received the rotation auxiliary force f, rotation of the free roller 11 (rotation in synchronization with the glass film 1) is naturally and stably started. Subsequently, the subsequent free rollers 11 on the downstream side also receive the rotation auxiliary force f, at the receiving portions 16 of the free rollers 11, the jets of the air from corresponding ones of the nozzles 19 similarly. With this, the free rollers 11 stably start to be rotated while supporting the glass film 1. With regard to the control of starting the ejection of the air, the ejection of the air may be started at once from all the nozzles 19 at a timing immediately before the most upstream one of the free rollers 11 and the forward end of the glass film 1 are held in abutment against each other, or the ejection of the air may be started from corresponding nozzles sequentially from the upstream side at timings immediately before the free rollers 11 and the forward end of the glass film 1 are brought into abutment against each other.

Further, when the jets of the air from the nozzles 19 continue to be ejected to the receiving portions 16 (specifically, to their projection portions 18) also after the free rollers 11 start to be rotated as described above, all the corresponding ones of the free rollers 11 continue to be rotated in synchronization with the glass film 1 under a state of uniformly receiving the rotation auxiliary force f (FIG. 1 and FIG. 2). In this way, the glass film 1 is conveyed, and the predetermined processes (washing, drying, and destaticizing) are performed respectively in the steps 2 to 4. In this case, there may be performed adjustments such that, for example, after elapse of a predetermined time period since most downstream one of the free rollers 11 (in FIG. 5, rightmost one of the free rollers 11), which starts to be held in contact with the glass film 1 last, has started to be rotated while supporting the glass film 1, flow rates of the air to be ejected from all the nozzles 19 may be collectively and relatively reduced. Alternatively, after elapse of a predetermined time period since the free rollers 11 have started to be rotated while supporting the glass film 1, flow rates of the air to be ejected from corresponding ones of the nozzles 19 may be relatively reduced sequentially from the upstream side.

With regard to the control of stopping the ejection of the air, the ejection of the air from all the nozzles 19 may be stopped at once at a timing when a rearward end portion of the glass film 1 passes a top of a most downstream one of the free rollers 11, or the ejection of the air from corresponding ones of the nozzles 19 may be stopped sequentially from the upstream side at timings when the rearward end portion of the glass film 1 passes tops of the free rollers 11.

As described above, according to the present invention, the flows of the air as a fluid are applied to the free rollers 11. With this, the rotation auxiliary force f is applied to the free rollers 11 in their rotation direction during the conveyance of the glass film 1 as a workpiece. As a result, the rotational resistance of the free rollers 11 having received the rotation auxiliary force f is improved (alleviated). Thus, the variation in rotational resistance among the free rollers 11 can be reduced to a maximum extent. Thus, at the time of being rotated while supporting the glass film 1, all the free rollers 11 can be rotated in synchronization with each other to a maximum extent. Therefore, occurrence of slippage between the free rollers 11 having relatively high rotational resistance and the glass film 1 can be suppressed. With this, the glass film 1 can be conveyed while damage to the glass film 1 is prevented as much as possible.

Further, in this embodiment, the receiving portions 16 configured to receive the flows of the air are arranged on the spindle 15 of the free roller 11 at the parts protruded outward from both the longitudinal ends of the free roller body 14. In addition, the nozzles 19 configured to eject the air are arranged vertically above the receiving portions 16. Thus, equipment of this type can be easily added without changing or expanding existing equipment. Therefore, the conveyance apparatus 8 according to the present invention can be provided at relatively low cost.

Further, in this embodiment, the receiving portions 16 each comprise the receiving portion base 17 axially adjacent to the free roller body 14, and the projection portions 18 protruded radially outward from the outer peripheral surface of the receiving portion base 17. Thus, even when a size and a configuration of the free roller 11 itself are not changed, a position to receive the air can be adjusted by changing a protrusion dimension of the projection portions 18. Thus, the nozzles 19 can be arranged with a higher degree of freedom. Further, as the protrusion dimension of the projection portions 18 is set larger, a higher moment can be obtained through the application of the jets of the air. Thus, even when the ejection flow rate is not set excessively high, the rotation auxiliary force f can be easily increased.

Hereinabove, description is made of the workpiece conveyance method and the workpiece conveyance apparatus according to the first embodiment of the present invention. However, as a matter of course, the conveyance method and the conveyance apparatus may employ an arbitrary mode within the scope of the present invention.

Figure 7:
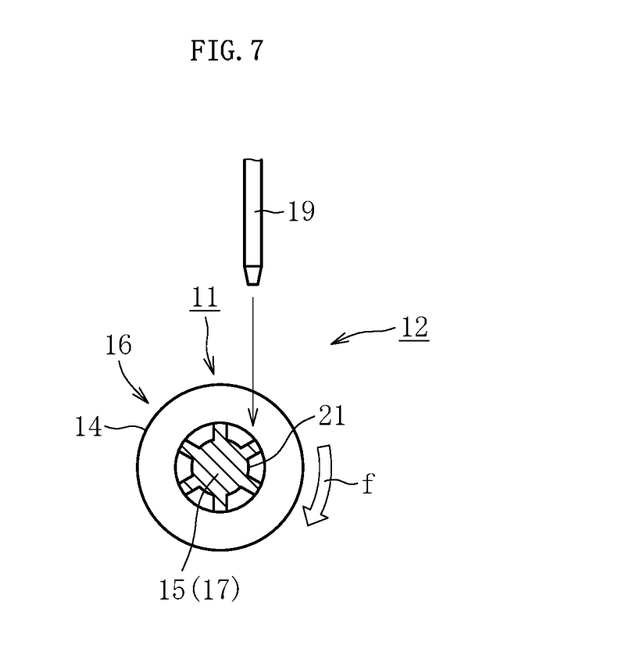
FIG. 7 is a sectional view for illustrating a main part of a workpiece conveyance apparatus according to a second embodiment of the present invention.
Figure 8:
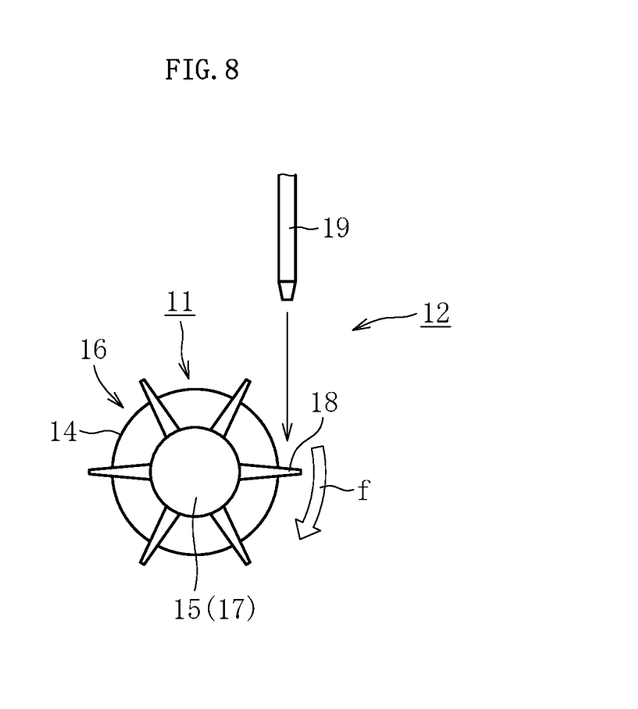
FIG. 8 is an enlarged view for illustrating a main part of a workpiece conveyance apparatus according to a third embodiment of the present invention.

For example, in the embodiment described above, the receiving portions 16 provided on the free rollers 11 each comprise the receiving portion base 17, and the projection portions 18 protruded radially outward from the outer peripheral surface of the receiving portion base 17. However, as a matter of course, other configuration may be employed as in an example illustrated in FIG. 7. The receiving portion 16 illustrated in FIG. 7 comprises the receiving portion base 17, and recess portions 21 retreated radially inward from the outer peripheral surface of the receiving portion base 17. In this case, the orientations and the positions of the nozzles 19 are set such that not only the recess portions 21 having received the flow (jet) of the air from the nozzle 19, but also an entirety of the receiving portion base 17 comprising those recess portions 21 are rotated in the same direction as that of the free rollers 11 during the conveyance of the glass film 1. With this configuration, the receiving portions 16 can be compactified. As a matter of course, the recess portions 21 may be formed into any shape, specifically, changed as appropriate in shape, number, and arrangement such that the flow (jet) of the air can be fully received. The projection portions 18 described above may also be similarly configured as a matter of course. For example, as illustrated in FIG. 8, the projection portions 18 formed on an outer periphery of the receiving portion base 17 may be formed into various shapes such as a shape of being reduced radially outward in dimension in its thickness direction (while uniform in thickness in its axial direction) or, although not illustrated, a shape (what is called "spiral shape") in which their distal end side is additionally curved radially outward in their rotational direction (direction of the rotation auxiliary force f).

Figure 9:
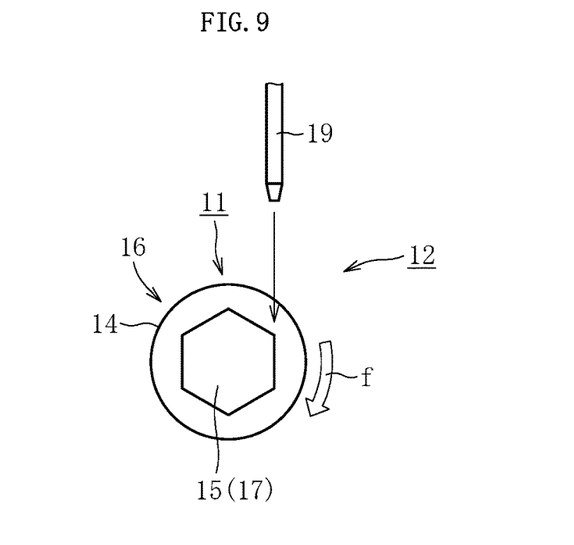
FIG. 9 is an enlarged view for illustrating a main part of a workpiece conveyance apparatus according to a fourth embodiment of the present invention.

Alternatively, a shape or a size of the outer peripheral surface of the receiving portion base 17 may be changed as appropriate such that a configuration capable of receiving the air as in an example illustrated in FIG. 9 is provided without forming the projection portions 18 and the recess portions 21. In the receiving portion 16 illustrated in FIG. 9, the receiving portion base 17 arranged at an end portion of the free roller body 14 is formed into a polygonal shape (regular hexagonal shape in the illustrated example) as viewed in the axial direction. Alternatively, although not illustrated, the receiving portion 16 may comprise the outer peripheral surface of the receiving portion base 17 formed into a perfect circular shape which is larger in diameter than the free roller body 14.

Further, although not illustrated, the receiving portion 16 may employ a mode in which the projection portions 18 are protruded directly from an outer peripheral surface of each of the end portions of the free roller body 14, or the recess portions 21 are directly formed therein. In those cases, the end portions of the free roller body 14 each serve as the receiving portion base 17.

Figure 10:
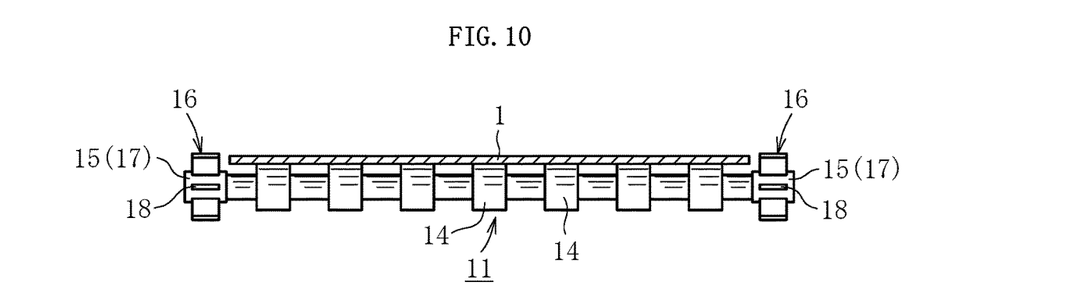
FIG. 10 is a sectional view for illustrating a main part of a workpiece conveyance apparatus according to a fifth embodiment of the present invention.

Still further, in an overall configuration of the free roller 11, as illustrated, for example, in FIG. 10, the free roller body 14 may comprises a plurality of free roller bodies 14 arranged at predetermined intervals in the axial direction. In this case, the free roller bodies 14 are fixed to a single spindle 15. Thus, when the jets of the air are impinged on the receiving portions 16 formed at both longitudinal ends of the spindle 15, the rotation auxiliary force f is uniformly applied to all the free roller bodies 14. In addition, all the free roller bodies 14 can be rotated in synchronization with each other while supporting the glass film 1.

Figure 11:
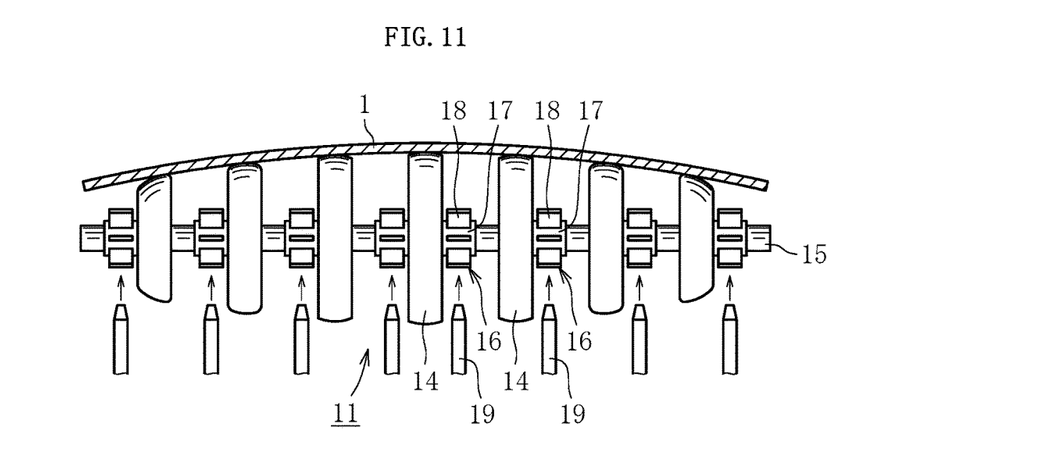
FIG. 11 is a sectional view for illustrating a main part of a workpiece conveyance apparatus according to a sixth embodiment of the present invention.

Alternatively, in the overall configuration of the free roller 11, as illustrated, for example, in FIG. 11, outer diameter dimensions of the free roller bodies 14 may be set different from each other in accordance with their longitudinal positions. This configuration is employed in consideration of a risk in that, depending on a relationship between an actual widthwise dimension and an actual thickness dimension of the glass film 1, as illustrated in FIG. 11, the glass film 1 is warped by its own weight along the width direction. In consideration of such droop deformation of the glass film 1 from a widthwise center toward both widthwise sides (in FIG. 11, both right and left sides), the outer diameter dimensions of the free roller bodies 14 are set relatively larger at the widthwise center, and the outer diameter dimensions of the free roller bodies 14 are set relatively smaller toward a widthwise outer side. In this case, the free roller bodies 14 are configured to be freely rotatable about the spindle 15 (spindle 15 may be fixed to a frame (not shown)). With this, even when the glass film 1 is warped, a lower surface of the glass film 1 is uniformly supported in an entire region to a maximum extent, and the free roller bodies 14 are rotated at the rotation rate in accordance with their outer diameter dimensions, and hence all the free roller bodies 14 can be rotated in synchronization with the glass film 1 without idling.

Further, in this case, the receiving portion 16 is mounted to a lateral surface of each of the free roller bodies 14, and the free roller bodies 14 and the receiving portions 16 are supported by the spindle 15 in a freely rotatable manner. With this, the rotation auxiliary force f generated by the jet of the air can be applied to each of the free roller bodies 14. Thus, even when the free rollers 11 configured as described above are actually used, variation in rotational resistance among the free roller bodies 14 and the free rollers 11 can be suppressed to a maximum extent, and hence all the free rollers 11 can be rotated in synchronization with each other to a maximum extent. As illustrated in FIG. 10, even when all the free roller bodies 14 have equal outer diameter dimension, as illustrated in FIG. 11, the receiving portion 16 may be mounted to the lateral surface of each of the free roller bodies 14, and the free roller bodies 14 and the receiving portions 16 may be supported by the spindle 15 in a freely rotatable manner.

Still further, with regard to a mode of ejecting the air, in the embodiments described above, the orientations of the nozzles 19 are set such that the air is ejected along a peripheral speed direction of the receiving portions 16 (tangential direction with respect to outer peripheral surfaces). However, as a matter of course, the ejecting direction of the air may be changed as appropriate in accordance with a form of the receiving portions 16. Further, with regard to the ejection flow rates of the air in that case, a control other than the above-mentioned control may be employed (for example, the flow rate may be changed in three or more stages, or maintained at a predetermined rate during the ejection).

Yet further, in the embodiments described above, there are described the cases where the jets of the air from the nozzles 19 are impinged immediately before the free rollers 11 start to be rotated while supporting the glass film 1 having received the conveying force F, and after the free rollers 11 start to be rotated while supporting the glass film 1 having received the conveying force F. However, the jets of the air may be impinged only in a time period immediately before the start of the rotation or after the start of the rotation.

Yet further, in the embodiments described above, there is described the case where the jets of the air from the nozzles 19 are employed as the flows of the fluid. However, as a matter of course, flows of fluid in other forms may be employed. For example, although not illustrated, the flows of the air may be applied uniformly to all the receiving portions 16 by ejecting the air from slit-like air outlets extending in a conveying direction in a form of a curtain. Alternatively, as long as cleanliness can be secured, a configuration of applying flows of fluid other than air may be employed. For example, flows of liquid may be applied to the receiving portions 16 by generating flows of a liquid (wash water) along the conveying direction in baths extending in the conveying direction, and by partially immersing the receiving portions 16 formed at the end portions of the spindle 15 into the baths.

Yet further, in the embodiments described above, there is described the case where the free rollers 11 each comprise the receiving portions 16. However, the present invention is not limited to this configuration. For example, as a matter of course, the present invention also encompasses a configuration of applying the flows of fluid directly to the outer peripheral surfaces of the free roller bodies 14, to thereby apply the rotation auxiliary force f to the free rollers 11.

Yet further, in the embodiments described above, there is illustrated the case where the roll core 6 of the glass roll 5 on the one side is driven to rotate to apply the primary conveying force F to the glass film 1. However, as a matter of course, the conveying force F may be applied to the glass film 1 with other units. For example, in the conveyance apparatus 8 illustrated in FIG. 1, instead of the driving rollers 13 arranged at both their longitudinal ends, belt conveyers of, for example, a vacuum suction type may be arranged. Alternatively, similar belt conveyers may be arranged also between the washing step 2, the drying step 3, and the destaticizing step 4.

Yet further, in the embodiments described above, there is illustrated the mode in which the glass film 1 is subjected to the washing step 2, the drying step 3, and the destaticizing step 4 (the mode in which the conveyance apparatus 8 is arranged such that the glass film 1 can be subjected to those steps). However, as a matter of course, the present invention may be applied also to production lines for carrying out other processing steps. For example, the present invention may be applied also to a production line in which the destaticizing step 4 is omitted and a surface treatment step such as end surface etching is performed instead after (downstream) the washing step. Alternatively, the present invention may be applied also to a production line in which, after the surface treatment step, an additional washing step (also referred to as "rinsing step") is carried out.

Yet further, in the description above, there is described a case where the present invention is applied to the conveyance method and the conveyance apparatus for the glass film as a workpiece. However, the present invention may be applied to cases of conveying workpieces other than the glass film with the conveying force F generated by their own weights, such as glass substrate pieces cut out of the belt-like plate glass. As a matter of course, it is needless to say that the present invention may be applied also to conveyance of sheet-like workpieces made of materials other than glass.

REFERENCE SIGNS LIST 1 glass film
2 washing step
3 drying step
4 antistatic step
5, 7 glass roll
6, 6' roll core
8 conveyance apparatus
9 resin sheet
10 conveying force applying unit
11 free rollers
12 auxiliary force applying unit
13 driving roller
14 free roller body
15 spindle
16 receiving portion
17 receiving portion base
18 projection portion
19 nozzle
20 coupling member
21 recess portion
f rotation auxiliary force
F conveying force

The invention claimed is:

1. A conveyance method for conveying a glass film in a predetermined direction by applying a conveying force to the glass film while supporting the glass film through use of free rollers, the conveyance method comprising:
applying flows of a fluid to the free rollers to apply a rotation auxiliary force to the free rollers in a rotation direction of the free rollers during conveyance of the glass film,
wherein one longitudinal end of the glass film has a resin sheet coupled thereto, and
wherein the applying of the flows of the fluid comprises starting the flows of the fluid to each of the free rollers when the resin sheet reaches a top of that free roller such that when the one longitudinal end of the glass film reaches the top of each of the free rollers, the free rollers are receiving the rotation auxiliary force.

2. The conveyance method according to claim 1, wherein the fluid comprises air to be impinged on the free rollers to apply the rotation auxiliary force to the free rollers.

3. The conveyance method according to claim 1, wherein, when predetermined processes of a Roll To Roll system are performed on the glass film, a part of the glass film drawn out of a glass roll, which is formed by rolling up the glass film, is supported by the free rollers.

4. The conveyance method according to claim 3, wherein under a state in which both sides of the glass film in a longitudinal direction are respectively rolled up into rolls, an operation of rolling up the glass film into a glass roll on one side gives a conveying force to the glass film drawn out of a glass roll on the other side.

5. The conveyance method according to claim 1, wherein the free rollers each comprise:
a free roller body to be held in abutment against the glass film; and
receiving portions formed so as to be rotatable integrally with the free roller body and configured to receive the flows of the fluid.

6. The conveyance method according to claim 5, wherein the receiving portions each comprise:
a receiving portion base axially adjacent to the free roller body; and
projection portions protruded radially outward from an outer peripheral surface of the receiving portion base.

7. The conveyance method according to claim 5, wherein the receiving portions each comprise:
a receiving portion base axially adjacent to the free roller body; and
recess portions retreated radially inward from an outer peripheral surface of the receiving portion base.

8. A conveyance apparatus for conveying a glass film, the conveyance apparatus comprising:
a conveying force applying unit configured to apply a conveying force to the glass film;
free rollers configured to support the glass film having received the conveying force; and
an auxiliary force applying unit configured to apply flows of a fluid to the free rollers to apply a rotation auxiliary force to the free rollers in a rotation direction of the free rollers during conveyance of the glass film,
wherein one longitudinal end of the glass film has a resin sheet coupled thereto,
wherein the auxiliary force applying unit comprises a control unit that controls the flows of the fluid, the control unit starting the flows of the fluid to each of the free rollers when the resin sheet reaches a top of that free roller such that when the one longitudinal end of the glass film reaches the top of each of the free rollers, the free rollers are receiving the rotation auxiliary force, and
wherein the free rollers each comprise:
a free roller body to be held in abutment against the glass film; and
receiving portions formed so as to be rotatable integrally with the free roller body and configured to receive the flows of the fluid.

* * * * *